Patented Sept. 21, 1937

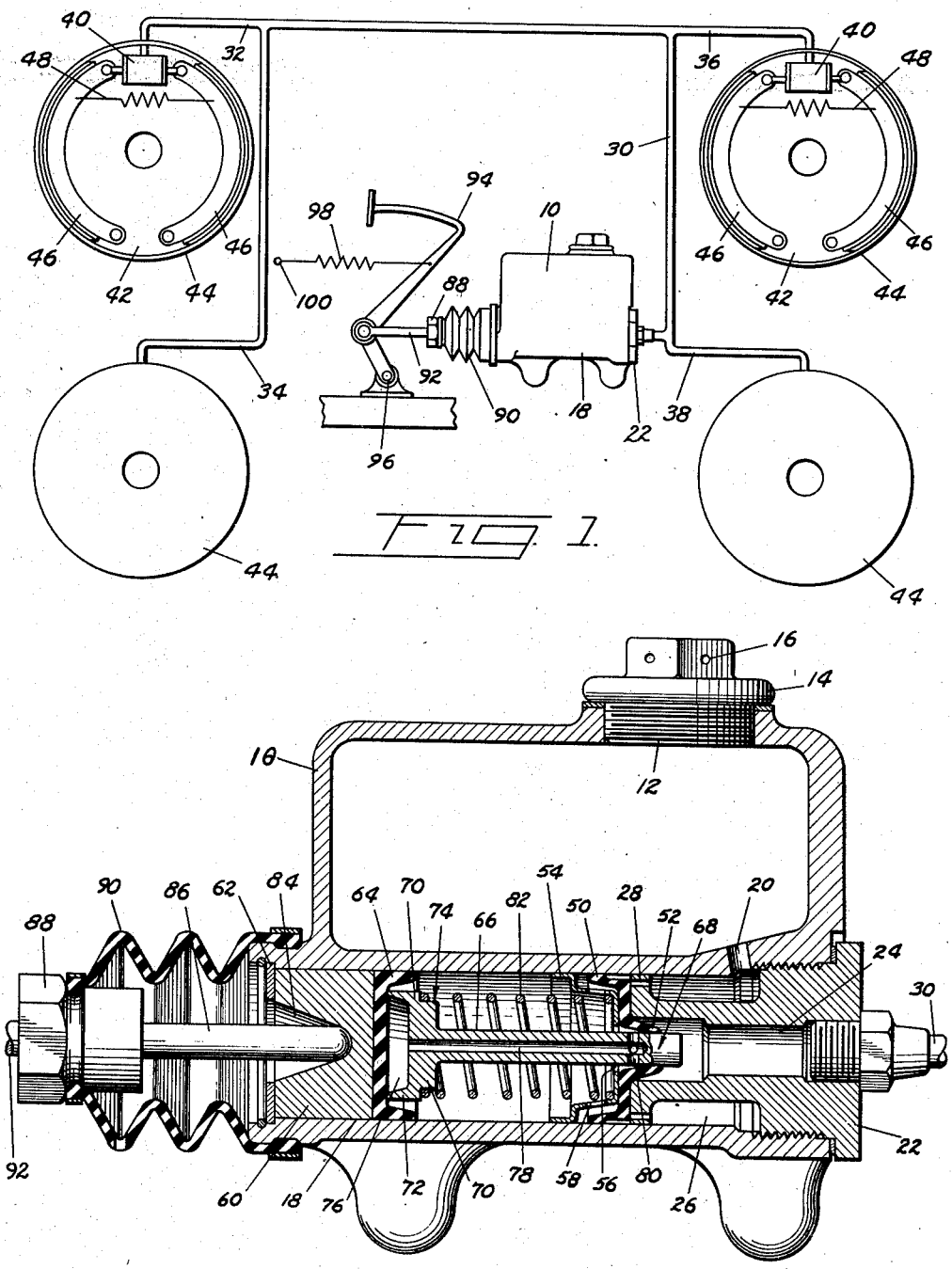

2,093,557

UNITED STATES PATENT OFFICE 2,093,557

FLUID PRESSURE PRODUCING DEVICE

Joseph R. Heidloff, Detroit, Mich., assignor to Hydraulic Brake Company, Detroit, Mich., a corporation of California Application February 20, 1936, Serial No. 64,854

7 Claims. (Cl. 60—54.6)

This invention relates to fluid pressure brake systems, and more particularly to fluid pressure producing devices for such systems.

An object of the invention is to generally improve the structure of fluid pressure producing devices.

Another object of the invention is to provide a fluid pressure producing device in which the supply port is not traversed by the reciprocating parts of the mechanism.

Another object of the invention is to provide a pressure producing device for a fluid pressure system in which the possibility of overloading the system is avoided.

Other objects of the invention will appear from the following description taken in connection with the drawing forming a part of this specification, and in which,—

Fig. 1 is a schematic view of a fluid pressure brake system embodying the invention; and Fig. 2 is a vertical sectional view of the fluid pressure producing device of the system.

Referring to the drawing for more specific details of the invention, 10 represents a fluid reservoir having a filling opening 12 which may be closed as by a plug 14 having openings 16 for venting the reservoir to the atmosphere. A cylinder 18 at the base of the reservoir has a port 20 adjacent its forward end providing a communication between the cylinder and the reservoir, and a head 22 threaded into the forward end of the cylinder has an axial bore providing a discharge port 24 for the cylinder. The head has a reduced section providing in conjunction with the wall of the cylinder an annular chamber 26 communicating with the reservoir 10 by way of the port 20, and a plurality of spaced ports 28 providing communications between the annular chamber 26 and the cylinder 18.

A fluid pressure delivery pipe or conduit 30 suitably connected to the discharge port 24 has branches 32, 34, 36 and 38 connected respectively to fluid pressure actuated motors 40 for actuating the friction elements of brakes. The motors are arranged in pairs, one pair for actuating the brakes associated with the front wheels of a motor vehicle and another pair for actuating the brakes associated with the rear wheels of the vehicle.

The brakes may be of conventional type including a fixed support or backing plate 42, a rotatable drum 44 associated therewith, corresponding friction elements or shoes 46 pivoted on the backing plate, and a motor such as the motor 40 mounted on the backing plate between the shoes and operative to spread the shoes into engagement with the drum 44 against the resistance of a retractile spring 48.

A collapsible leak-proof cup 50 seated on the head of the cylinder controls the ports 28. This cup has a concentric converging tube 52 extending into the discharge port 24, the purpose of which will hereinafter appear, and a spring seat 54 slidable in the cylinder rests in the bottom of the cup. The spring seat has a concentric opening 56, registering with the converging tube 52, and a plurality of spaced ports 58 in its wall, the purpose of which will also hereinafter appear. A detailed description of the collapsible leak-proof cup 50 is omitted from the instant application since the cup constitutes the subject matter of my application for United States Letters Patent, Serial No. 54,491, filed December 14, 1935.

A piston 60 reciprocable in the cylinder 18 is retained against displacement by a washer 62 suitably secured in the open end of the cylinder, and seated on the head of the piston is a leakproof cup 64 providing against seepage of fluid from the cylinder. A pin 66 reciprocable in the converging tube, and providing in conjunction therewith a control valve indicated generally at 68 for the discharge port, has a head 70 provided with a flange 72 normally seated on the leak-proof cup 64 on the head of the piston and cooperating therewith to provide a valve indicated generally at 74. A chamber 76 of the valve 74 communicates with an axial passage 78 in the pin, and the pin has diametral passages 80 providing communications, when the apparatus is at rest, between the axial passage 78 in the pin 66 and the cylinder 18. A spring 82 interposed between the head 70 and the spring seat 54 urges the valves 68 and 74 to their seats and also serves to return the piston to its retracted position.

The piston has a recess 84 in its back for the reception of one end of a thrust pin 86, on the other end of which is a coupling 88 connected by a flexible boot 90 to the open end of the cylinder for the exclusion of dust, moisture and other foreign substances. A rod 92 connects the coupling 88 to a foot pedal lever 94 pivotally mounted as at 96 and connected by a retractile spring 98 to a fixed support 100.

In operation, upon depressing the foot pedal lever 94, force is transmitted therefrom through the rod 92 and the thrust pin 86 to the piston 60, resulting in moving the piston on its compression stroke. As the piston moves on its compression stroke fluid is displaced from the cylinder 18 past the valve 68, thence through the discharge port 24 and fluid pressure delivery pipe 30 and its branches, into the fluid pressure actuated motors 40, causing actuation of the motors with the resultant movement of the shoes 46 against the resistance of the retractile springs 48 into engagement with the drums 44. When the pressure in the system reaches a degree sufficiently high to effectively actuate the brakes, the pin 66 has advanced sufficiently to place the diametral passages 80 in the pin in direct communication with the system.

Upon release of the foot pedal lever by the operator of the vehicle, this lever is returned to its normal position under the influence of its retractile spring 98. This movement of the foot pedal lever retracts the rod 92 and the thrust pin 86, resulting in the release of the piston, whereupon the piston is free to be moved toward its retracted position by the forces acting upon it.

At the moment the foot pedal lever is released, the space 76 between the piston 60 and valve 74 is in direct communication with the wheel cylinders through passages 78 and 80 and the conduits leading to the wheel cylinders. The retractile springs 48 create a pressure on the fluid in the wheel cylinders and conduits and this pressure forces the fluid back into the cylinder through passages 78 and 80, space 76, and an opening created between valve 74 and piston 60 by the action of this returning fluid in forcing the piston 60 to the left. This returning fluid continues to force the piston 60 to the left and the valve 74 under the action of its spring 82 closely follows the piston in its retractile movement.

When the valve 74 has moved such a distance toward the left that the passages 80 enter the converging tube 52 of the cup 50, these passages 80 are thereupon cut off from communication with the wheel cylinders. The spring 82 then moves valve 74 into contact with cup 64 on the head of piston 60, and thereafter valve 74 and piston 60 move together toward the left and thereby create vacuum in the cylinder which is satisfied by fluid from the reservoir which is drawn in past the cup 50. After the passages 80 have been cut off from communication with the wheel cylinders by the tube 52, any fluid returned by the wheel cylinders must lift the cup 50 from its seat and flow back into the reservoir through passages 28 and 20.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure producing device comprising a cylinder having inlet and discharge ports, a piston reciprocable in the cylinder, a valve controlling the ports, and a valve on the piston communicating with the discharge port when the piston is on its compression stroke and controlling the creation of suction in said cylinder during the return stroke of said piston.

2. A fluid pressure producing device comprising a cylinder having inlet and discharge ports, a piston reciprocable in the cylinder, a valve controlling the ports, and a valve on the head of the piston operative to alternately communicate with the cylinder and the discharge port to control the creation of suction in said cylinder during the return stroke of said piston.

3. A fluid pressure producing device comprising a cylinder having an inlet port and a discharge port, a piston reciprocable in the cylinder, a valve controlling the inlet port having a converging sleeve extending into the discharge port, and a valve on the head of the piston having a stem movable in the sleeve, said stem having a passage operative to alternately communicate with the cylinder and the discharge port.

4. A fluid pressure producing device comprising a reservoir, a cylinder having an inlet port communicating with the reservoir and a discharge port, a piston reciprocable in the cylinder, a valve controlling the inlet port, a converging sleeve on the valve extending into the discharge port, a valve on the head of the piston having a stem movable in the sleeve, a chamber in the valve, and a passage in the stem communicating with the chamber and alternately communicating with the cylinder and the discharge port.

5. A fluid pressure producing device comprising a reservoir, a cylinder having an inlet port communicating with the reservoir and a discharge port, a piston reciprocable in the cylinder, a valve controlling the inlet port, a converging sleeve on the valve extending into the discharge port, a valve on the head of the piston having a stem extending through the sleeve, a spring interposed between the valves, a chamber in the valve on the piston, and a passage in the stem of the valve communicating with the chamber and alternately communicating with the cylinder and the discharge port.

6. A fluid pressure producing device comprising a reservoir, a cylinder having an inlet port communicating with the reservoir, a head on the cylinder having an opening providing a discharge port for the cylinder, a piston reciprocable in the cylinder, a flexible cup on the head of the cylinder controlling the inlet port, a converging sleeve on the cup extending into the discharge port, a leak-proof cup on the head of the piston, a valve seated on the leak-proof cup, a stem for the valve extending through the sleeve, a spring interposed between the valves, a chamber in the valve on the leak-proof cup, and a passage in the stem of the valve communicating with the chamber and adaptable for alternate communication with the cylinder and the discharge port.

7. A fluid pressure braking system comprising a reservoir, a cylinder having an inlet port communicating with the reservoir, a head on the cylinder having an opening providing a discharge port for the cylinder, a fluid pressure motor connected to the discharge port, a friction element actuated by the motor, a flexible cup on the head of the cylinder controlling the inlet port, a converging sleeve on the cup extending into the discharge port, a piston reciprocable in the cylinder, means for advancing the piston, a leak-proof cup on the head of the piston, a valve seated on the leak-proof cup, a stem on the valve extending through the sleeve, a chamber in the valve, and a passage in the stem communicating with the chamber and adapted for alternate communication with the cylinder and the discharge port, and retractile means associated with said motor for controlling said valve.

JOSEPH R. HEIDLOFF.